(12) United States Patent
Awadallah-F et al.

(10) Patent No.: US 9,394,418 B2
(45) Date of Patent: Jul. 19, 2016

(54) SOL-GEL TEMPLATES FORMED WITH INFUSION OF GAS BUBBLES

(71) Applicant: QATAR UNIVERSITY, Al Tarfa, Doha (QA)

(72) Inventors: Ahmed Awadallah-F, Cairo (EG); Shaheen A. Al-Muhtaseb, Doha (QA)

(73) Assignee: Qatar University, Doha (QA)

( * ) Notice: Subject to any disclaimer, the term of this patent is extended or adjusted under 35 U.S.C. 154(b) by 121 days.

(21) Appl. No.: 14/288,322

(22) Filed: May 27, 2014

(65) Prior Publication Data
US 2015/0344657 A1    Dec. 3, 2015

(51) Int. Cl.
C08J 9/00      (2006.01)
C08J 9/30      (2006.01)
C08J 9/14      (2006.01)
C08J 9/12      (2006.01)
C08G 8/22      (2006.01)

(52) U.S. Cl.
CPC . *C08J 9/141* (2013.01); *C08G 8/22* (2013.01); *C08J 9/122* (2013.01); *C08J 9/30* (2013.01); *C08J 2201/026* (2013.01); *C08J 2203/06* (2013.01); *C08J 2203/14* (2013.01); *C08J 2205/026* (2013.01); *C08J 2205/028* (2013.01); *C08J 2205/042* (2013.01); *C08J 2361/12* (2013.01)

(58) Field of Classification Search
None
See application file for complete search history.

(56) References Cited

U.S. PATENT DOCUMENTS

| | | | | |
|---|---|---|---|---|
| 4,755,377 | A * | 7/1988 | Steer | A61L 9/048 239/60 |
| 5,077,241 | A | 12/1991 | Moh et al. | |
| 8,318,191 | B2 | 11/2012 | Yun et al. | |
| 2003/0236313 | A1* | 12/2003 | Pearce | A23G 3/36 521/79 |

(Continued)

FOREIGN PATENT DOCUMENTS

| | | |
|---|---|---|
| DE | 3628948 | 3/1988 |
| JP | 2011-176101 | 9/2011 |
| KR | 100932949 | 12/2009 |

OTHER PUBLICATIONS

Lu et al., "Preparation of Highly Crystalline Sol-Gel Derived Nano-Sized ITO Powders by Supercritical Carbon Dioxide Drying," International SAMPE Symposium and Exhibition, 51, pp. 1-8 (2006).*

(Continued)

*Primary Examiner* — Kara Boyle
(74) *Attorney, Agent, or Firm* — Squire Patton Boggs (US) LLP

(57) ABSTRACT

The sol-gel templating with the infusion of gas bubbles provides a process for synthesizing polymeric or gel materials while being templated with slow bubbling of various gases into the reacting media upon the polymerization or gelation stage. The process uses a source of gas, which is delivered at a desired rate and pressure via at least one inert tube directly into the reacting solution while the gel is being formed by sol-gel process. The tube(s) have a diameter selected to produce bubbles that result in the desired pore size and the number and placement of the tubes is selected to produce the desired pore structure and surface area in the gel template. The gel may be any gel capable of being formed by sol-gel process. The gas may be selected from carbon dioxide, methane, nitrogen, helium, argon, oxygen, hydrogen, propane, ethane, propylene, ethylene, air, and n-butane and other inert gases.

16 Claims, 16 Drawing Sheets

(56) References Cited

U.S. PATENT DOCUMENTS

2009/0303660 A1* 12/2009 Nair ................ H01G 11/46
361/502
2012/0130489 A1 5/2012 Chernomorsky et al.

OTHER PUBLICATIONS

Tamagawa et al., "Pores and diffusion characteristics of porous gels", Polymer (2000), Vo. 41, pp. 7201-7207.

Shaheen A. Al-Muhtaseb and James A. Ritter, "Preparation and Properties of Resorcinol-Formaldehyde Organic and Carbon Gels", Adv. Mater. (2003), vol. 15, No. 2, pp. 101-114.

Zuniga and J.M. Aguilera, "Aerated food gels: fabrication and potential applications", Trends in Food Science & Technology (2008), vol. 19, pp. 176-187.

Eghe A. Oyedoh et al., "Preparation of Controlled Porosity Resorcinol Formaldehyde Xerogels for Adsorption Applications", Chemical Engineering Transactions (2013), vol. 32, pp. 1651-1656.

* cited by examiner

SOL-GEL TEMPLATES FORMED WITH INFUSION OF GAS BUBBLES

BACKGROUND OF THE INVENTION

1. Field of the Invention

The present invention relates to polymerization by sol-gel process and particularly to sol-gel templates that are formed with the infusion of gas bubbles to create a desired pattern of nanosize pores in the gel-matrix template.

2. Description of the Related Art

With the advent of nanotechnology, porous polymeric structures having nanosize pores have become structures of much value and interest. They may be used in numerous applications, including enzyme immobilization, biocatalysts, biosensors, solid oxide fuel cells, oxygen sensors, adsorbents, catalyst supports, electrode materials, energy storage devices, drug carriers, column packing materials for chromatography, etc. This novel gas templating method can be very useful in designing and tailoring the pore structures of polymeric materials, polymer-based carbons, and gels (e.g., resorcinol-formaldehyde gels, including aerogels, xerogels, cryogels, carbon aerogels, carbon xerogels, etc.) in a controlled and easy manner.

Recently, there has been some interest in using bubbles of gas to aid in the design and tailoring of gel templates. However, current methods rely upon the use of chemical precursors that react within the gel to form gas bubbles (which are sometimes designed to "explode" or burst within the gel) or the electrochemical generation of gas bubbles within the gel. The problems with such methods are that they often leave residues of unreacted precursors, or they leave a residue of solid reaction by-products, result in distorted pore sizes, and such methods are difficult to control the size of the resulting pores and the distribution of the resulting pores within the gel.

Thus, a sol-gel templates formed with the infusion of gas bubbles solving the aforementioned problems is desired.

SUMMARY OF THE INVENTION

The sol-gel templates formed with the infusion of gas bubbles provides a process for synthesizing polymeric materials while being templated with slow bubbling of various gases into the reacting media upon the polymerization or gelation stage. The process uses a source of gas, which is delivered at a desired rate and pressure via at least one polypropylene tube directly into the sol-gel matrix while the polymer or gel is being formed by a sol-gel process. The polypropylene tube(s) have a diameter selected to produce bubbles that result in the desired pore size, and the number and placement of the tubes are selected to produce the desired pore pattern and surface area in the gel template. The polymer or gel may be any polymer or gel capable of being formed by sol-gel process, and the gas may be selected from carbon dioxide, methane, nitrogen, helium, argon, oxygen, hydrogen, propane, ethane, propylene, ethylene, air, and n-butane.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
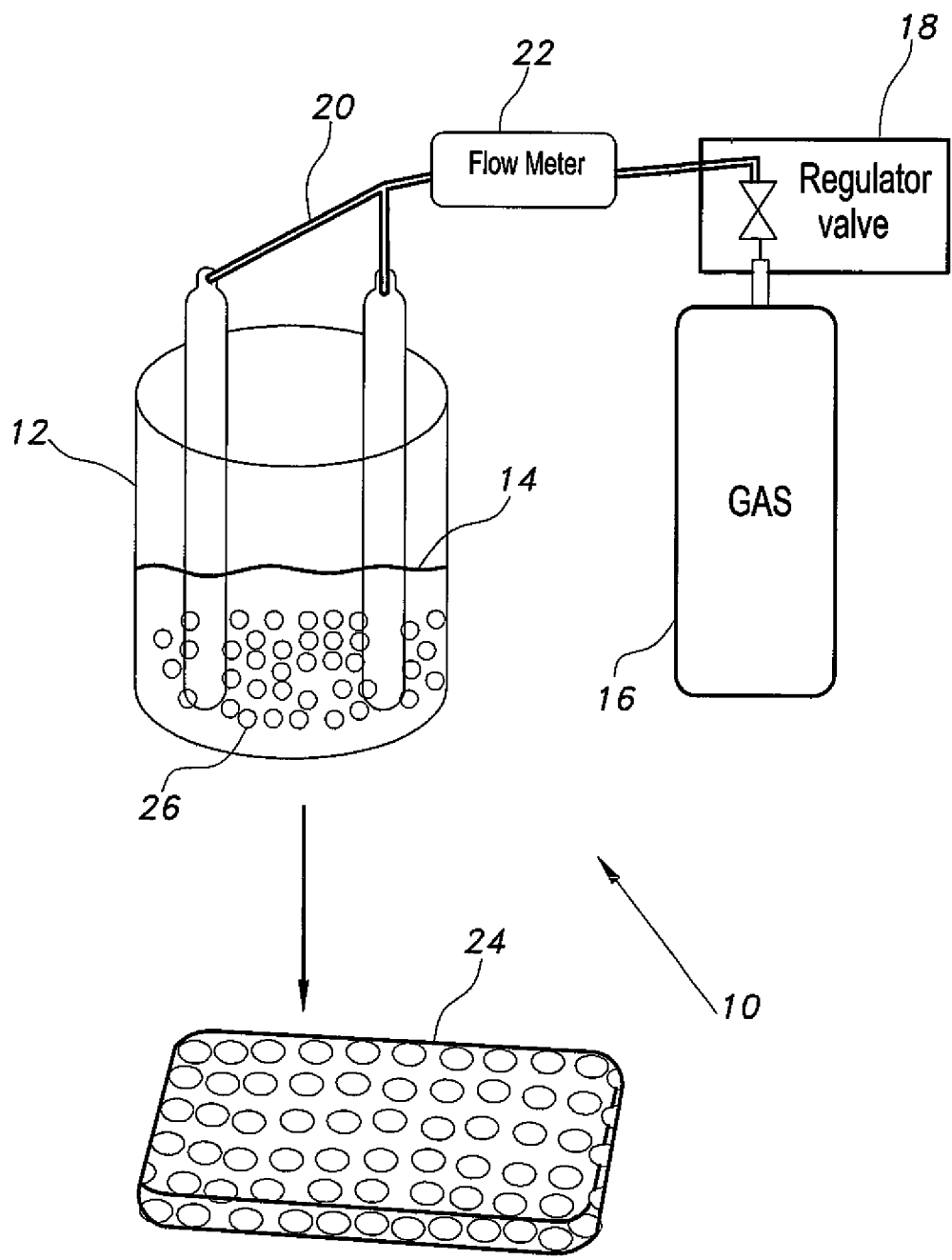
FIG. 1 is an environmental, perspective view of a gas templating of gel samples according to the present invention.

The sol-gel templates formed with the infusion of gas bubbles provides a process for synthesizing polymeric materials while being templated with slow bubbling of various gases into the reacting media upon the polymerization or gelation stage. The process uses a source of the desired gas (e.g., gas cylinder), which delivers the desired gas at a specific rate and pressure via a suitable tube (or tubes) (e.g. of polypropylene) directly into the initial reactants, while the polymer or gel is being formed by a sol-gel process. The tube(s) has a diameter selected to produce bubbles that result in the desired pore size, and the number and placement of the tubes is selected to produce the desired pore pattern, pore volume distribution, accumulative pore volume, pore surface area distribution, and accumulative pore surface area in the gel template. The polymer or gel may be any polymer or gel capable of being formed by sol-gel process, and the gas may be selected from carbon dioxide, methane, nitrogen, helium, argon, oxygen, hydrogen, propane, ethane, propylene, ethylene, air, n-butane and other gases.

Polymerization or gelation by the sol-gel process normally involves dissolving the initial reactants and a catalyst or initiator in a solvent. The reactants form polymer or gel strands in a colloidal solution (the "sol" of the sol-gel name). The solution undergoes a curing process in which the polymer strands are cross-linked, resulting in a gel. The polymer or gel may be cured by placing the sol-gel reactants in a sealed container (to reduce evaporation of the solvent) that is heated for an extended period of time (e.g., one week), during which extensive gelation and crosslinking occur. If a xerogel is desired, drying may be performed at room temperature, resulting in collapse of the supporting structure (gel networks) and densification of the formed gel. If an aerogel is desired, the drying may be done at supercritical temperatures, thereby retaining the supporting structure or gel networks. Freeze-drying may be used to form a cryogel. Further, the process may be completed by a carbonization process (to form a carbon gel) and finalized with an activation process (to form an activated carbon gel).

The gel can be placed or deposited on a substrate to form a film, cast in a container or mold to form a product of a desired shape, or formed as a powder. In conventional sol-gel processes, the porosity and resulting surface area of the gel is controlled by a number of factors, including the type or nature of the precursors, the ratio of solid to liquid, the type of catalyst or gel initiator, the type of solvent, temperature, pH, relative and absolute concentrations of the reactants, and the rate of removal of the solvent during the drying process.

In order to control the properties of the gel template formed by the sol-gel process, the present inventors modify the conventional sol-gel process to infuse gas bubbles into the sol-gel process with slow bubbling of various gases into the reacting media upon the polymerization or gelation stage. This development of the process modifies and changes the properties of the final product. In addition to the regular synthesis conditions (including reactants' concentrations, initial solution pH, catalyst type and gelation temperature), the characteristics of the gas-templated gel products depend on templating gas type, gas pressure, and gas flow rate. Furthermore, it also depends on the reactor design, number of gas tubes used in the bubbling process and the gas tube design. Molecules of any specific gas have certain characteristic sizes and features, which differ from those of others. The bubbling of a single gas or mixed gases into a certain polymerizing or gelation medium leads to changes in output product characteristics, such as pore properties (i.e., pore size distribution, pore volume, surface area, etc.), physical properties (i.e., color change, crystallinity and amorphicity, thermal stability, affinity to adsorption, etc.), chemical properties (i.e., chemical composition, chemical bonds, etc.), mechanical properties and morphological features. These changes depend basically on the reactants' concentrations, gas type(s), flow rate and pressure of the bubbling gas, temperature, solution acidity/basicity (pH) level, and reactor design. As a result, the final product characteristics are tailored basically by these parameters.

FIG. 1 shows a schematic diagram of an apparatus 10 for infusing gas bubbles into the gel as the polymerization or gelation reaction (crosslinking of the polymer to form the gel) takes place. The polymerization or gelation takes place in a sealed container 12 that holds or supports the reactants 14. The gas is stored in a gas cylinder 16 having a regulator and valve assembly 18. At least one gas delivery tube 20 extends from the gas cylinder 16 to the container 12, and may have a flow meter 22 inline to monitor and control delivery of gas to the container 12 or reaction vessel. The schematic diagram shows two gas delivery tubes 20 for purposes of illustration. However, it will be understood that the number of tubes and their pattern may vary, depending upon the desired template pattern. The tubes 20 may be made of polypropylene, glass, or other material inert to the gas being delivered, and the outlets of the tubes 20 are immersed in the sol-gel medium to produce gas bubbles. Bubbling the gas through the medium of initial reactants produces the porous gel template 24.

As mentioned above, the process may be applied to any polymer or gel capable of being synthesized by sol-gel process. The process will now be illustrated by examples that utilize a cross-linked gel polymer formed by resorcinol and formaldehyde. It will be understood, however, that the process may be applied to any polymer or gel, e.g., resorcinol-furfural, phenol-resorcinol, catechol-formaldehyde, phloroglucinol-formaldehyde, etc.

Resorcinol (ACS, 99.98%, Alfa Aesar), formaldehyde (37 wt % in 1120 with 10-15% methanol as stabilizer, Aldrich), sodium carbonate (anhydrous, ACS, Fisher), and acetone (optima, 99.6%, Fisher) were used as received. Ultra-purified water produced from Milli-Q integral water purification system was used in all experiments. Other reagents, such as $CH_3COOH$ (100%, BDH), $HNO_3$ (70%, Fisher), $PbCl_2$ (99.999%, Aldrich), $NiCl_2$ (99.999%, Aldrich), $CrCl_3$ (99%, Aldrich), and $NH_4OH$ (24%, Fluka), are analytical grade. All gases used in the adsorption/desorption isotherms and bubbling experiments (carbon dioxide, methane, nitrogen, helium, argon, oxygen, hydrogen, propane, ethane, propylene, ethylene, and n-butane) were supplied by National Industrial Gas Plants (NIGP, Doha-Qatar) with grade-5 purities (>99.999%).

Example 1

Synthesis of Resorcinol-Formaldehyde Xerogels

The preparation method of resorcinol-formaldehyde gels (RFGs) with $Na_2CO_3$ as a catalyst has been described in former works. The molar ratios of resorcinol-to-formaldehyde, resorcinol-to-water, and resorcinol-to-catalyst used were, respectively, 0.5, 0.05 and 500. Resorcinol (11.1252 g) and sodium carbonate (0.0214 g) were weighed and mixed with ultrapure water (29.15 $cm^3$) in Erlenmeyer flasks and stirred magnetically for 3 h to guarantee that all resorcinol and sodium carbonate anhydrate are completely dissolved in clear color.

When all the reactants are completely dissolved with clear color; a bubbling process of a chosen templating gas (e.g., nitrogen, oxygen, methane, ethylene, ethane, propylene, n-butane, air, propane, helium, argon, carbon dioxide or hydrogen) into the reaction media was performed. Furthermore, the flow rate and pressure of bubbling gases used before initiation of reaction are 70 $cm^3$/min and 0.3 bar, respectively. Afterwards, the flow rate and pressure of gases used in the bubbling process during initiation of reaction are 15 $cm^3$/min and 0.3 bar, respectively. The bubbling gas process is introduced through capillary tubes immersed in the bulk of solution of the reactants.

Then, the specified quantity of formaldehyde (15.56 $cm^3$) was added to the dissolved reactants, while continuing the bubbling of the chosen gas, and mixing sufficiently to make sure that no precipitate forms in the reacting solution.

After that, the solution acidity was adjusted to a pH of 7.0±0.1 by using droplets of diluted nitric acid ($HNO_3$) and ammonium hydroxide ($NH_4OH$) solutions. The resorcinol-formaldehyde (RF) solutions were then poured into cylindrical polypropylene vials with continuation of gas flow into reaction medium until the partial solidification occurs. The vial was sealed and placed in an oven at 70° C. for 7 days to complete their gelation. In order to prevent the dehydration of the formed gels, and to accelerate the gelation time and enhance their crosslinking, 2% of acetic acid was poured upon the sol-gel surfaces after partial solidification. The vials were then removed from the oven and allowed to cool down spontaneously naturally to room temperature. The remaining solution above the cured gels was then decanted and exchanged with acetone at room temperature before ambient drying, as explained elsewhere. The formed xerogels were carbonized and activated in sequence procedures to produce resorcinol-formaldehyde activated carbon gels (RF-ACGs).

Example 2

Synthesis of Resorcinol-Formaldehyde Activated Carbon Gels (RF-ACGs)

The dried RF gel samples were placed in ceramic boats with dimensions 20 cm in length, 1.5 cm in width and 1.5 cm in height (Morgan advanced ceramics) inside a programmable electric-heated tube furnace (Nabertherm GmbH), with a continuous flow of nitrogen (100 $cm^3$/min) with pressure 0.3 bar. The furnace was first maintained at room temperature for 50 min to make sure that the air is completely purged and replaced with the flowing nitrogen gas. Then, the furnace was heated up to a temperature of 500° C. with a heating rate of 10° C./min. The gel sample was maintained at 500° C. for 3 h, and then allowed to cool down spontaneously to room temperature while passing nitrogen gas. The resulting carbon gel samples were then activated in the same tube furnace with $CO_2$ gas flow (150 $cm^3$/min with pressure 0.3 bar) instead of nitrogen gas, heating the gel samples again with a rate of 10° C./min to 700° C., maintaining this temperature for 1 h, and then allowing the gel samples to cool down spontaneously to room temperature while passing gas of $CO_2$.

Example 3

Characterization of RFGs and RF-ACGs

The pore structure characteristics of RFGs and RF-ACGs were measured using the adsorption/desorption isotherms of nitrogen gas at 77 K by a Micromeritics ASAP2420 accelerated surface area and porosimetry system with an enhanced micropore capability (utilizing 1-Torr pressure transducer). Prior to the adsorption/desorption isotherm measurements, the samples were regenerated in-situ for 8 h at 90° C. for gel samples and 12 h at 150° C. for activated carbon gel samples under vacuum ($1 \times 10^{-4}$ Pa). The total pore volume was calculated from the adsorbed volume of nitrogen at a temperature of 77 K and the relative pressure ($P/P_0$) of up to 0.99 (99% of the saturation pressure). The pore size distributions were then obtained by density functional theory (DFT) calculations, which were built into the system. The morphology of resorcinol-formaldehyde gels and resorcinol-formaldehyde activated carbon gels were observed with an FEI Nova™ NanoScanning Electron Microscope 450 (Nova NanoSEM). Thermogravimetric analysis (TGA) measurements of the dried gels were carried out under a nitrogen atmosphere with PerkinElmer Pyris 6 TGA-Thermogravimetric Analyzer in the temperature range from an ambient temperature up to 900° C., with a heating rate of 10° C./min. Wide-angle X-ray diffraction (WAXD) measurements of the samples were conducted in the reflection mode at room temperature using a Bruker-D2 Phaser. The Cu Kα radiation (λ=1.54 Å) source was operated at a voltage of 50 kV and a current of 40 mA. The 2θ scan data were collected at 0.02° intervals over the range of 5 to 80°, and at a scan speed of 0.02(2 h)/min. Fourier transform infrared (FTIR) spectra were measured with ATI Genesis Series FTIR spectrophotometer using KBr pellet to ascertain the structure of RF gel samples. Spectra were acquired in wave numbers between 4000 and 400 $cm^{-1}$. The chemical compositions of resorcinol-formaldehyde gels and resorcinol-formaldehyde activated carbon gel samples were investigated by CHNS/O analyzer (2400, Series II, Perkin Elmer). Adsorption/desorption isotherm measurements of pure $CO_2$, $CH_4$ and $N_2$ onto RF-ACGs were performed using a HyGra™ Microbalance with the Microgram option (Rubotherm, Germany). Furthermore, the adsorption of heavy metal ions from their aqueous solutions were performed through measuring their remaining concentrations via an Agilent 7500a model ICP-MS system, which can be used for simultaneous multi-element detection of $Cr^{3+}$, $Ni^{2+}$, and $Pb^{2+}$ ions.

Bubbling of gases into reaction media led to changes in the properties of final products as compared to conventionally-produced samples. These changes are outlined in relation to the Figures as follows.

Example 4

Effect of Gas Type on Pore Density and Pore Size of RFGs

Figure 2:
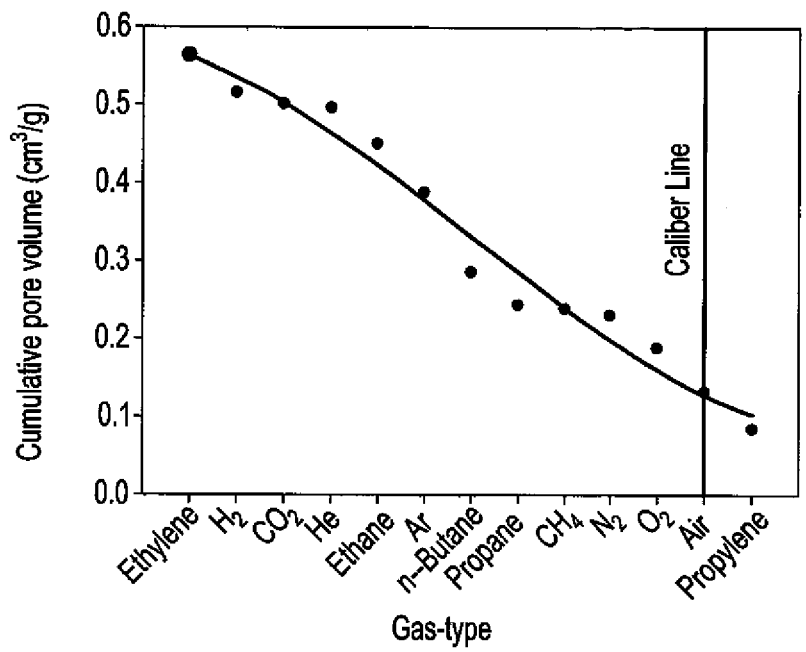
FIG. 2 is a graph of cumulative pore volume of resorcinol-formaldehyde gels as a function of the type of gas infused pending the gel formation.

FIG. 2 exposes the relationship between cumulative pore volume ($cm^3/g$) for RFGs (resorcinol-formaldehyde gels) prepared with similar recipes at a fixed gelation temperature (70° C.), upon bubbling of different gases at a fixed pressure (1 bar). It was observed that the cumulative pore volume ($cm^3/g$) corresponding to each gas differs from the other gases. The highest cumulative pore volume (0.56 $cm^3/g$) was obtained when the ethylene gas was bubbled during the synthesis, whereas the lowest cumulative pore volume (0.08 $cm^3/g$) was obtained when bubbling the reacting solution with atmospheric air. The order of RFG cumulative volumes in terms of bubbled gas type is ethylene>hydrogen>carbon dioxide>helium>ethane>argon>n-butane>propane>methane>nitrogen>oxygen>air>propylene.

Figure 3:
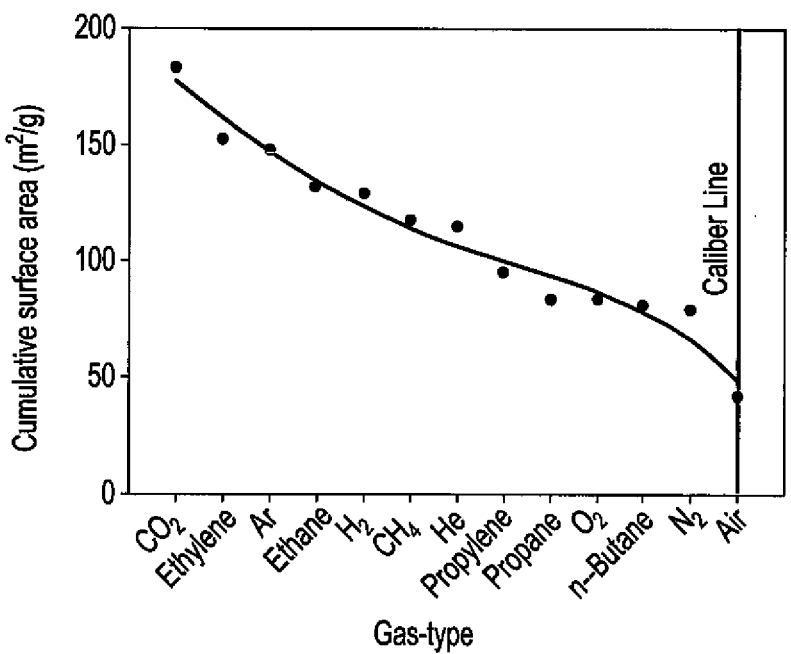
FIG. 3 is a graph of cumulative surface area of resorcinol-formaldehyde gels as a function of the type of gas infused pending the gel formation.

FIG. 3 shows the relationship between the cumulative surface area ($m^2/g$) of RFGs prepared with similar recipes and fixed gelation temperature (70° C.) and gas type, upon bubbling of different gases at a fixed pressure (1 bar). It was observed that the bubbling of carbon dioxide gas into the reacting solution produces the highest cumulative surface area (~183 $m^2/g$). On the other hand, bubbling of atmospheric air into the same reacting solution produces the lowest cumulative surface area (~42 $m^2/g$). The sequence order of cumulative surface areas of RFGs upon bubbling with different gases is carbon dioxide>ethylene>argon>ethane> hydrogen>methane>helium>propylene>propane>oxygen> n-butane>nitrogen>air.

Figure 4:
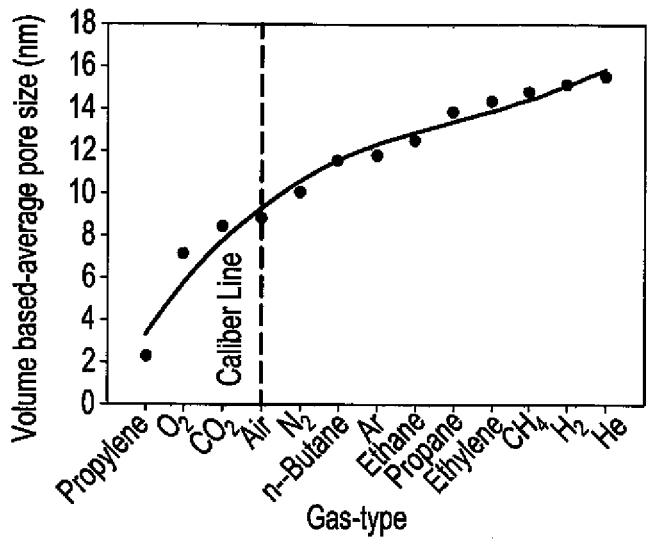
FIG. 4 is a graph of volume-based average pore size of resorcinol-formaldehyde gels as a function of the type of gas infused pending the gel formation.
Figure 5:
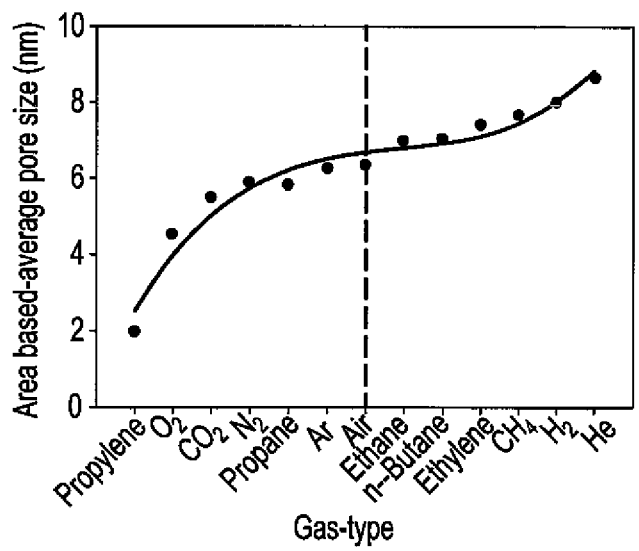
FIG. 5 is a graph of surface area-based average pore size of resorcinol-formaldehyde gels as a function of the type of gas infused pending the gel formation.

FIGS. 4 and 5 illustrate the effect of bubbled gas type on the volume-based average pore size and the surface area-based average pore size, respectively, of RFGs templated by infusion of bubbles of the different gases under the aforementioned conditions. Generally, it was observed that the average pore size could be changed significantly by bubbling of different gases. Nonetheless, there is no clear direct relationship between physical or chemical properties of the gases and the average pore size of the templated RFG samples. Therefore, it is believed that the underlying relationships between the bubbled gas type and the average pore size are more complicated than being directly related to physical or chemical properties of these gases. Interestingly, it is observed from FIGS. 4 and 5 that it is possible to increase the volume-based average pore size from ~2 to ~9 nm and the surface area-based average pore size from ~2 to ~16 nm when the reaction media is bubbled with propylene and helium gases during synthesis, respectively.

Overall, it is concluded that the bubbling of different gases into the reaction media of resorcinol and formaldehyde solutions during the synthesis stage leads to significant pore structural changes involving cumulative pore volume, cumulative pore area, as well as volume-based and surface area-based average pore size of the RFGs. As a result, it is evident that the infusion of gas bubbles into RFGs solution media during their gelation process has profound effects on their pore structure characteristics.

Example 5

Effect of Gas Pressure on Pore Size of RFGs

According to the hypothesis introduced above, not only the gas type can affect the templated structures of gels, but some other key factors related to the gas templating conditions (such as gas pressure, gas flow rate, number of bubbling tubes, gas-type, and design of bubbling tubes, etc.) can also affect the templated structures. To investigate the effect of gas bubbling pressure, $CO_2$ was chosen as a representative of various gases because it resulted in the highest cumulative surface area, as shown previously.

Figure 6:
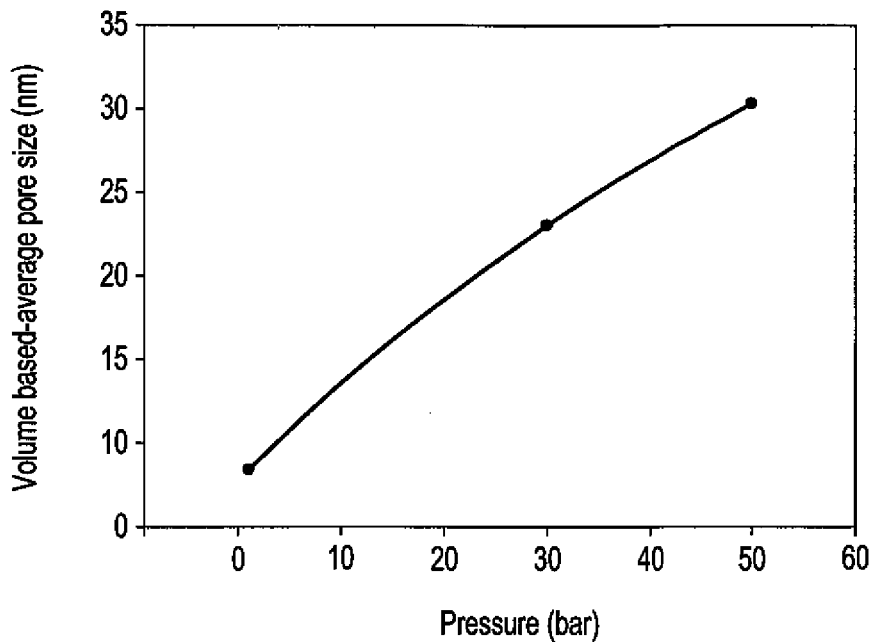
FIG. 6 is a graph of volume-based average pore size of resorcinol-formaldehyde gels as a function of the pressure of gas infused pending the gel formation.
Figure 7:
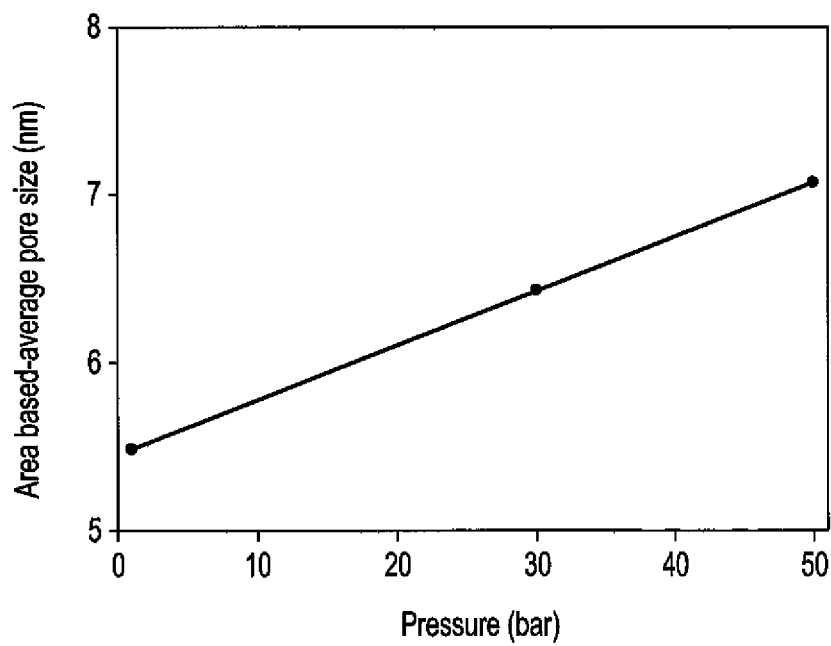
FIG. 7 is a graph of surface area-based average pore size of resorcinol-formaldehyde gels as a function of the pressure of gas infused pending the gel formation.
Figure 8:
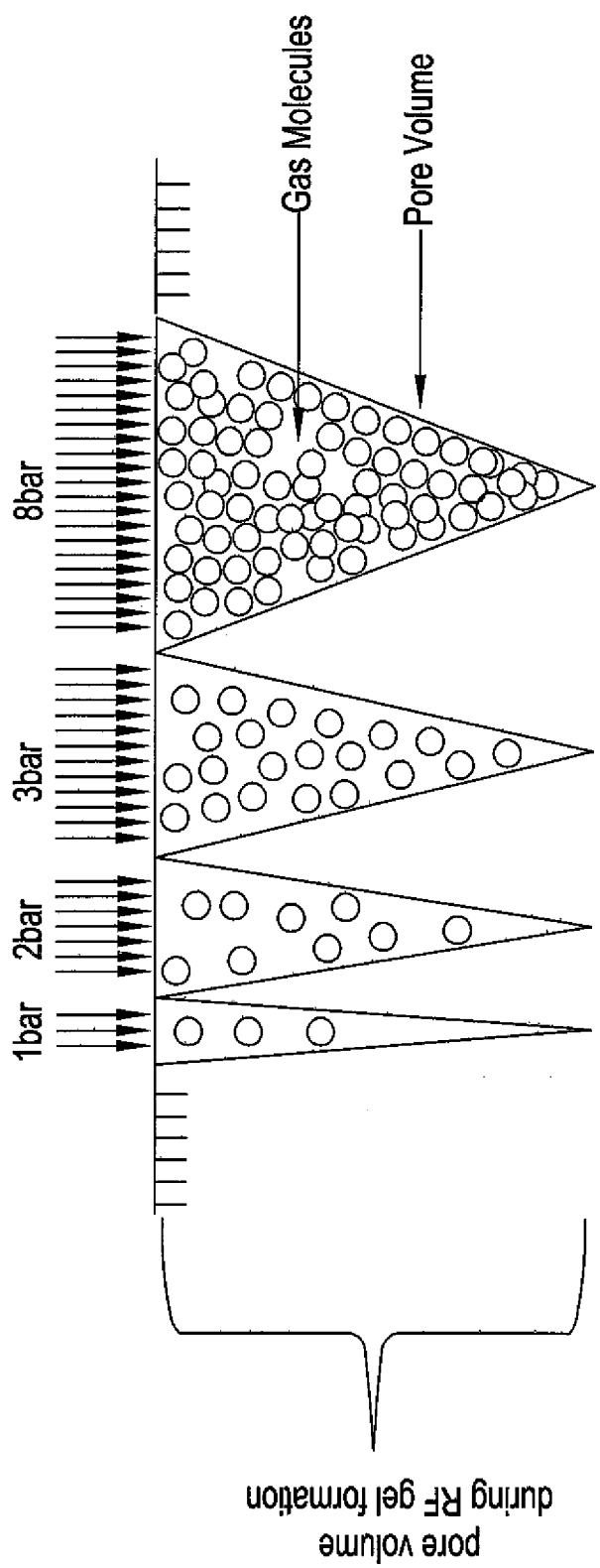
FIG. 8 is a schematic diagram showing pore volume as a function of pressure during resorcinol-formaldehyde gel formation, depicting gas molecules lodged temporarily in pores of the gel template formation.
Figure 9:
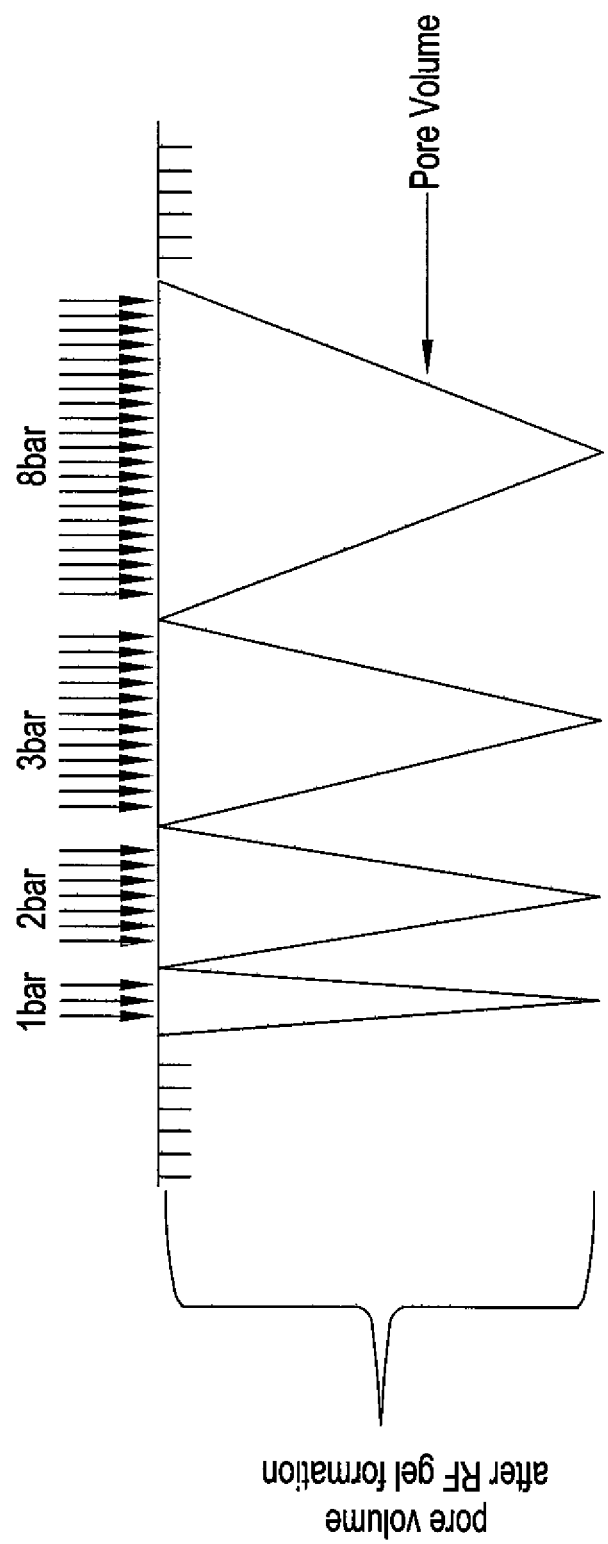
FIG. 9 is a schematic diagram showing pore volume as a function of pressure after resorcinol-formaldehyde gel formation, depicting no gas molecules lodged temporarily in pores of the gel template formation.

FIGS. 6 and 7 depict the effect of applied $CO_2$ gas pressure on average pore width (nm) of $CO_2$-templated RFG samples. On the whole, it was observed from FIG. 6 that the volume-based average pore size increased remarkably by increasing the gas pressure. This is because a high gas pressure could make the gas molecules penetrate within gel networks formation with more force, which is believed to make it reside for longer times inside the gel matrix during the crosslinking phase. Therefore, the volume-based average pore size increases with the applied pressure. After crosslinking and solidification, the gas molecules leave their temporarily lodged, leaving their own fingerprints there. This suggested mechanism is illustrated in FIGS. 8 and 9.

FIG. 7 shows the effect of $CO_2$ gas pressure on the surface area-based average pore size of $CO_2$—templated RFGs. It was observed that the surface area-based average pore size of RF gels increases with increasing applied pressure of $CO_2$ gas, but to a lesser extent than the volume-based average pore size exhibited in FIG. 6. This is believed to happen because a higher pressure of $CO_2$ gas increases the collision onto the boundaries of the crosslinking gel pores, which increases the pore surface indentations, leading to an increase in the surface area-based average pore size.

Overall, it could be concluded from FIGS. 6 and 7 that the gas pressure applied during the gas-templating synthesis of gels has a clear effect on the pore size of the resulting pore structure of gel template. Further, it should be considered that magnitude of the gas pressure results in different pore sizes of gel templates, and is different from one gas type to another.

Figure 10:
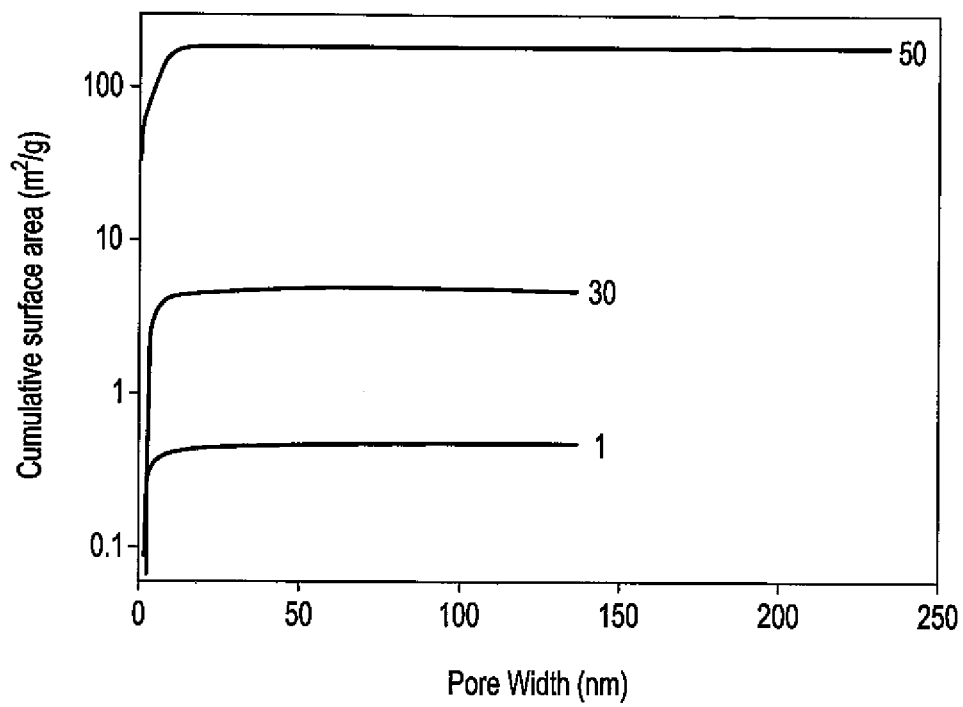
FIG. 10 is a graph of cumulative surface area of resorcinol-formaldehyde gels as a function of the pore width (nm) at different pressures, with the pressure values (in bar) of gas infused pending the gel formation indicated on the corresponding curves.
Figure 11:
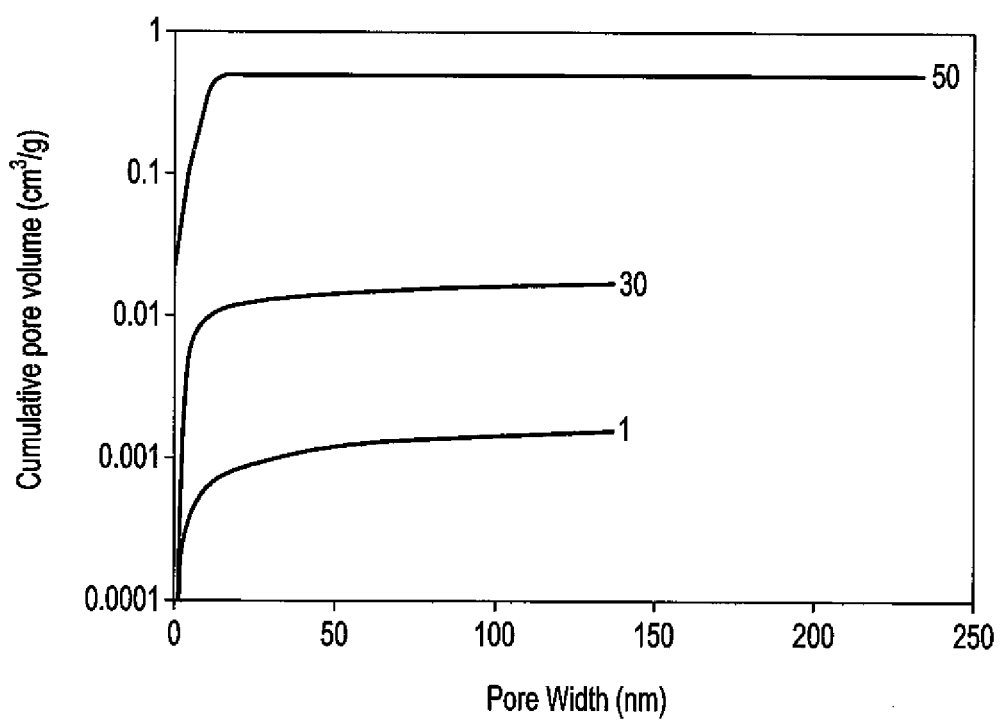
FIG. 11 is a graph of cumulative pore volume of resorcinol-formaldehyde gels as a function of the pore width (nm) at different pressures, with the pressure values (in bar) of gas infused pending the gel formation indicated on the corresponding curves.

FIGS. 10 and 11 illustrate the effect of $CO_2$ gas pressure on the cumulative surface areas and cumulative pore volumes of templated RFGs. It was observed that both the cumulative surface area and cumulative pore volume increases with increasing $CO_2$ pressure. Consequently, the pressure of the bubbling gas into the reaction media of the RF solution has clear and significant effects on the cumulative surface areas and cumulative pore volumes thereof.

Example 6

Effect of Gas Type on Pore Density and Pore Size of RF-ACGs

Figure 12:
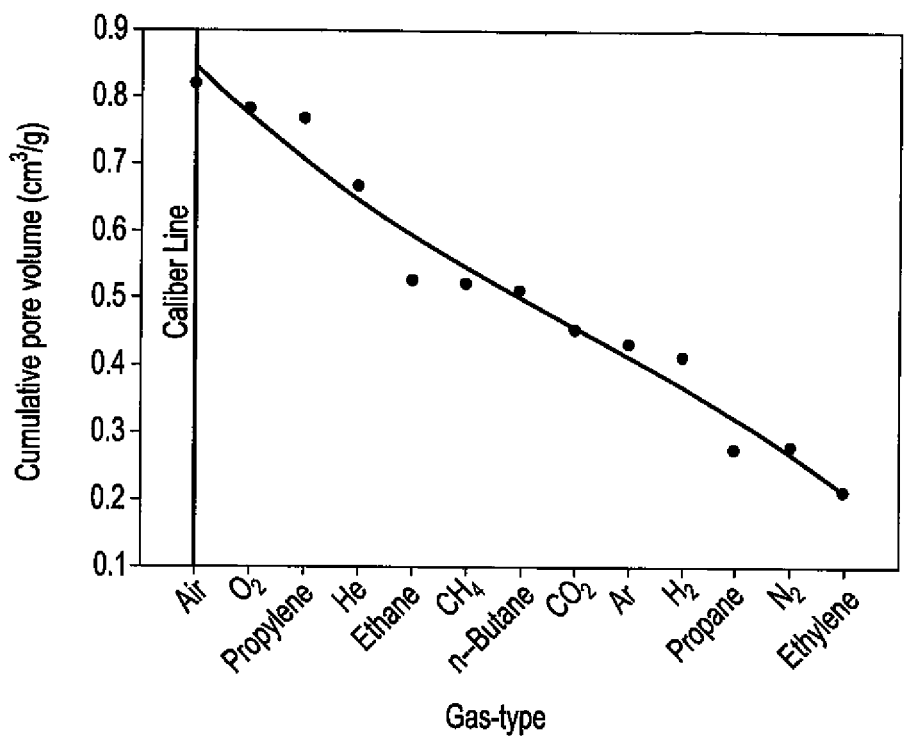
FIG. 12 is a graph of cumulative pore volume of resorcinol-formaldehyde activated carbon gels as a function of the type of gas infused pending the gel formation.

Gas-templated xerogels synthesized with bubbling of different gases (including normal atmosphere (air), oxygen, propylene, helium, nitrogen, methane, n-butane, carbon dioxide, argon, hydrogen, propane, ethylene and ethane) into their solution media during their reaction process were carbonized and activated to produce resorcinol-formaldehyde activated carbon gels (RF-ACGs), as described in Example 2. FIG. 12 elucidates the relationship between the cumulative pore volume and gas type of these RF-ACG samples. It was observed that the highest cumulative pore volume (~0.82 cm$^3$/g) was obtained for the RF-ACG that was obtained from the air-templated gel. The lowest cumulative pore volume (~0.2 cm$^3$/g) was for the RF-ACG obtained from the ethylene-templated RFG. The sequence order of these gases in terms of resulting RF-ACG cumulative pore volumes is: air>oxygen>propylene>helium>ethane>methane>n-butane>carbon dioxide>argon>hydrogen>propane> nitrogen>ethylene. It could be concluded that the gas type applied into the reacting RF solution during synthesis affects the pore properties of templated RF-ACGs.

Figure 13:
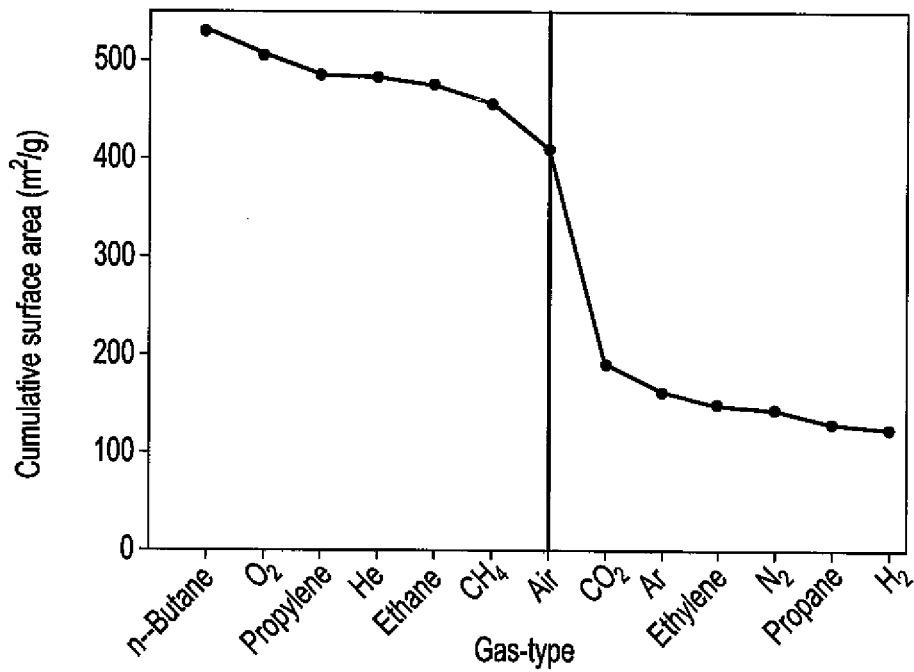
FIG. 13 is a graph of cumulative surface area of resorcinol-formaldehyde activated carbon gels as a function of the type of gas infused pending the gel formation.

FIG. 13 shows the effect of bubbled gas type (i.e., propane, nitrogen, argon, carbon dioxide, air, methane, helium, oxygen, n-butane, propylene, hydrogen ethylene, and ethane) on the cumulative pore surface area of the resulting RF-ACGs. The highest cumulative surface area (~550 m$^2$/g) was achieved for the RF-ACG obtained from the n-butane-templated RFG, whereas the lowest cumulative surface area (~123 m$^2$/g) was for the RF-ACG corresponding to the propane-templated RFG. Therefore, it could be deduced that the bubbling of different gases during the synthesis of gas-templated RF-ACG affects the surface area of the pores.

Figure 14:
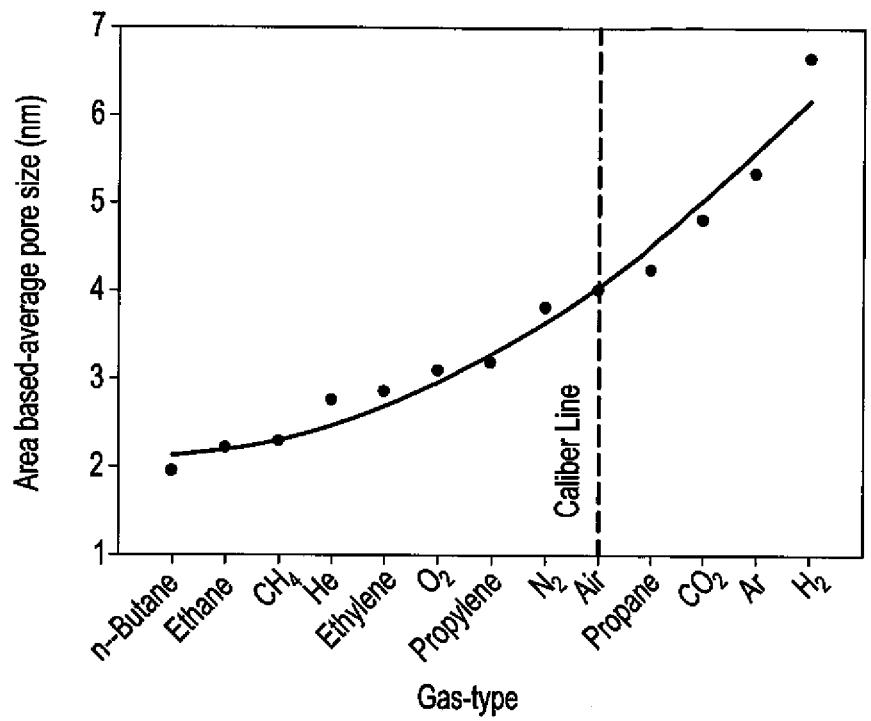
FIG. 14 is a graph of surface area-based average pore size of resorcinol-formaldehyde activated carbon gels as a function of the type of gas infused pending the gel formation.
Figure 15:
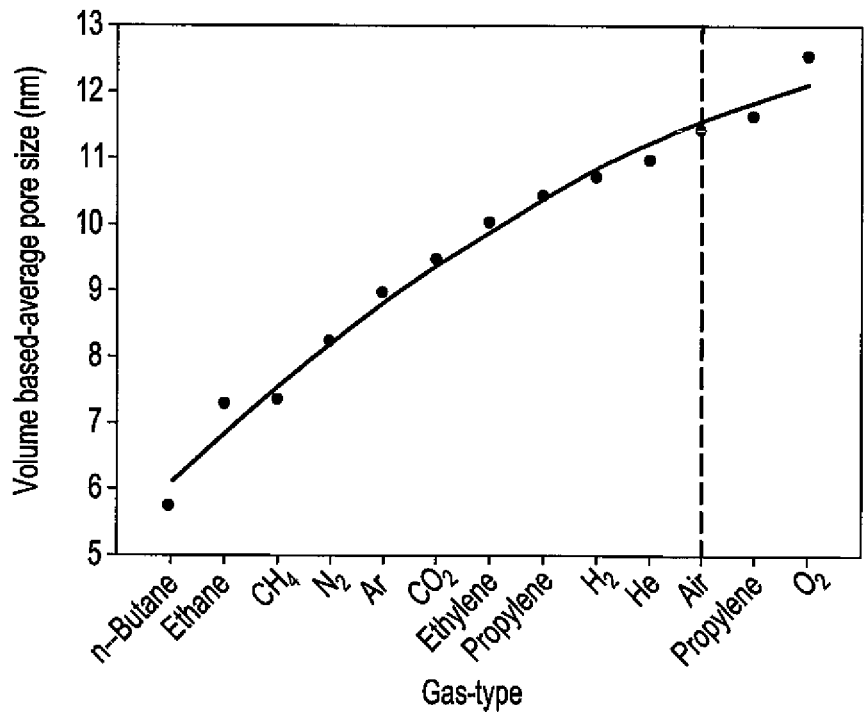
FIG. 15 is a graph of volume-based average pore size of resorcinol-formaldehyde activated carbon gels as a function of the type of gas infused pending the gel formation.

FIG. 14 shows the effect of the bubbled gas type (i.e., propane, nitrogen, argon, carbon dioxide, air, methane, helium, oxygen, n-butane, propylene, hydrogen, ethylene and ethane) on the surface area-based average pore size of RF-ACG samples. It is observed that templating with n-butane produces the lowest surface area-based average pore size (~2 nm), whereas hydrogen gas templating of RF-ACG gives the highest value of surface area-based average pore size (~6.6 nm). From this, it could be concluded that the type of gas used in templating affects the pore size of both RFGs as well as their derived activated carbons (RF-ACGs). FIG. 15 illustrates the effect of templating gas type on the volume-based average pore size of RF-ACGs. The highest average pore size (~13.5 nm) was for the RF-ACG corresponding to the oxygen gas-templated RF-ACG, whereas the lowest value (~5.5 nm) was for the RF-ACG corresponding to the n-butane-templated RF-ACG. Overall, the sequence order of the templating gas effect on the volume-based average pore size is oxygen>propylene>air>helium>hydrogen>propane> ethylene>carbon dioxide>argon>nitrogen>methane> ethane>n-butane.

Example 7

Thermogravimetric Analysis

Figure 16:
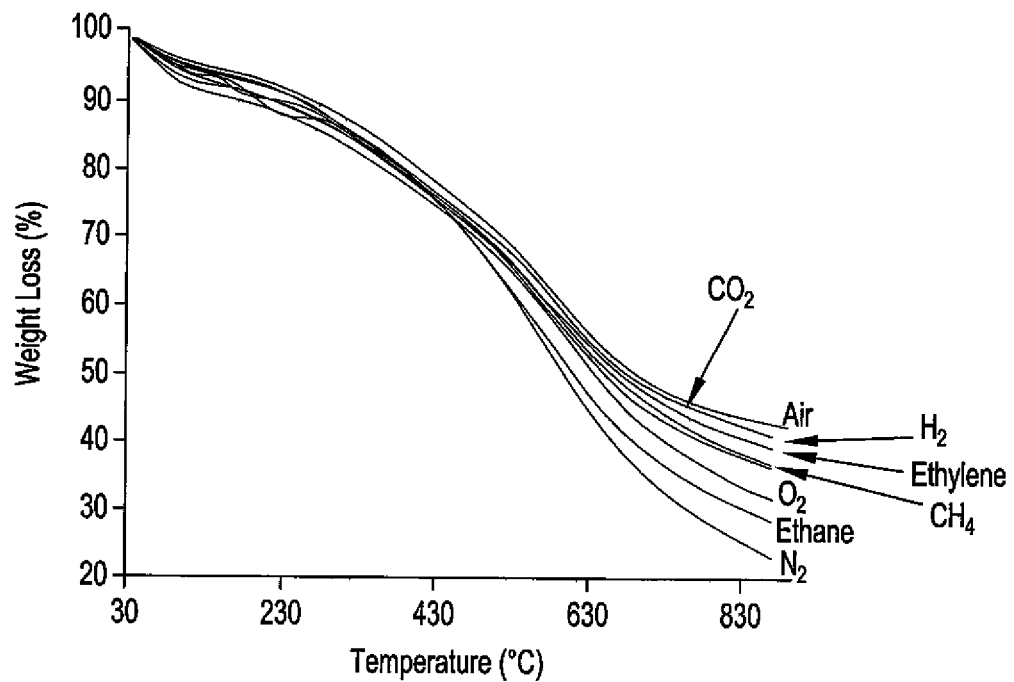
FIG. 16 is a chart of thermogravimetric curves showing mass loss as a function of temperature for resorcinol-formaldehyde gels for different types of gases infused pending the gel formation.

The thermogravimetric analysis (TGA) results presented in FIG. 16, which shows the relationship between the weight losses (%) of RFGs templated with different gases (i.e., propane, nitrogen, argon, carbon dioxide, air, methane, helium, oxygen, n-butane, propylene, hydrogen, ethylene and ethane) versus decomposition temperatures. It was observed that changing the templating gas type reflects on changes in the thermal stabilities of the corresponding gas-templated RFGs. Further, the hydrogen gas-templated RFG gave the highest thermal stability (up to 730° C.), whereas the argon gas-templated RFG gave the lowest thermal stability (up to 460° C.) compared to the other RFG samples. It is concluded that the type of gas infused into the sol-gel solution affects significantly the thermal stabilities of the resulting RFG products (i.e., gel and its derivatives).

Figure 17:
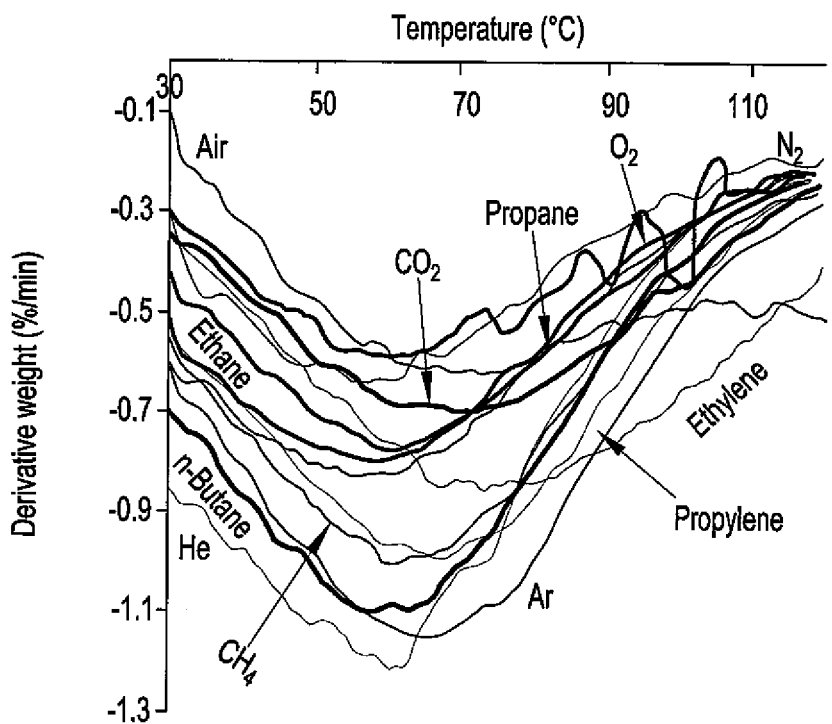
FIG. 17 is a chart showing the first derivatives of the thermogram curves of FIG. 16, showing the rate of change of mass loss.

FIG. 17 reveals the TGA thermogram derivatives for gas-templated RFGs. Generally, it was observed that the water content inside RFG matrices differs from one sample to another based on the type of gas used in templating. The air gas-templated RFG has lowest water content, whereas the helium gas-templated RFG has the highest water content in its matrix. Consequently, it could be said that the type of templating gas affects significantly the water content inside the corresponding templated RFG samples.

Figure 18:
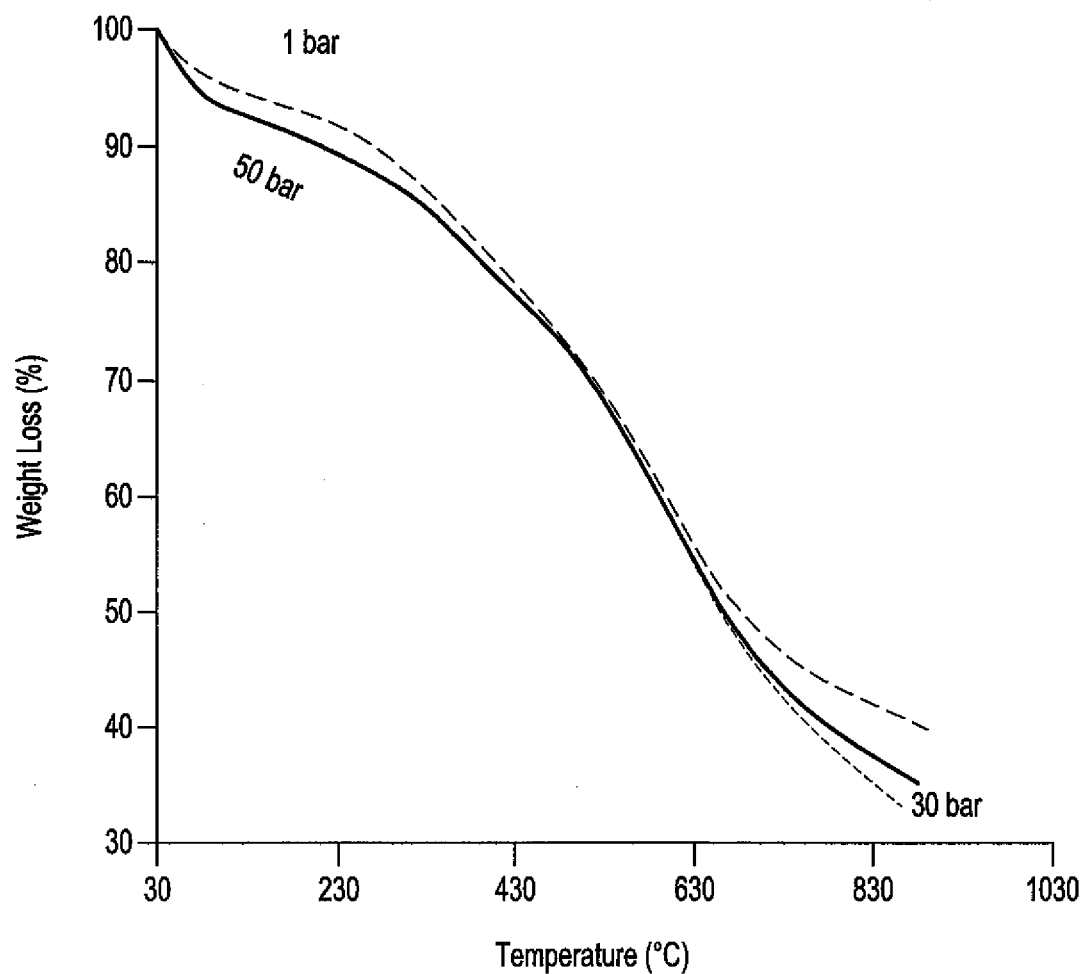
FIG. 18 is a chart showing thermogravimetric mass loss curves for resorcinol-formaldehyde gels infused with carbon dioxide gas at different pressures.

FIG. 18 describes the effect of pressure of the infused gas (demonstrated by the carbon dioxide templating of RFGs) on the thermal stability of the templated RFGs. Overall, it is observed that the effect of the pressure of the infused gas on the resulting thermal stability is minor, especially in the range of 230-630° C. and afterwards (>630° C.), the change of thermal stability is significant among gases. Nonetheless, outside this range, increasing the pressure of bubbled carbon dioxide reduces its thermal stability. In other words, RFGs that are templated at lower pressures are slightly more thermally stable than those templated at high pressures.

Example 8

Crystallinity of Resorcinol-Formaldehyde Xerogels

Figure 19:
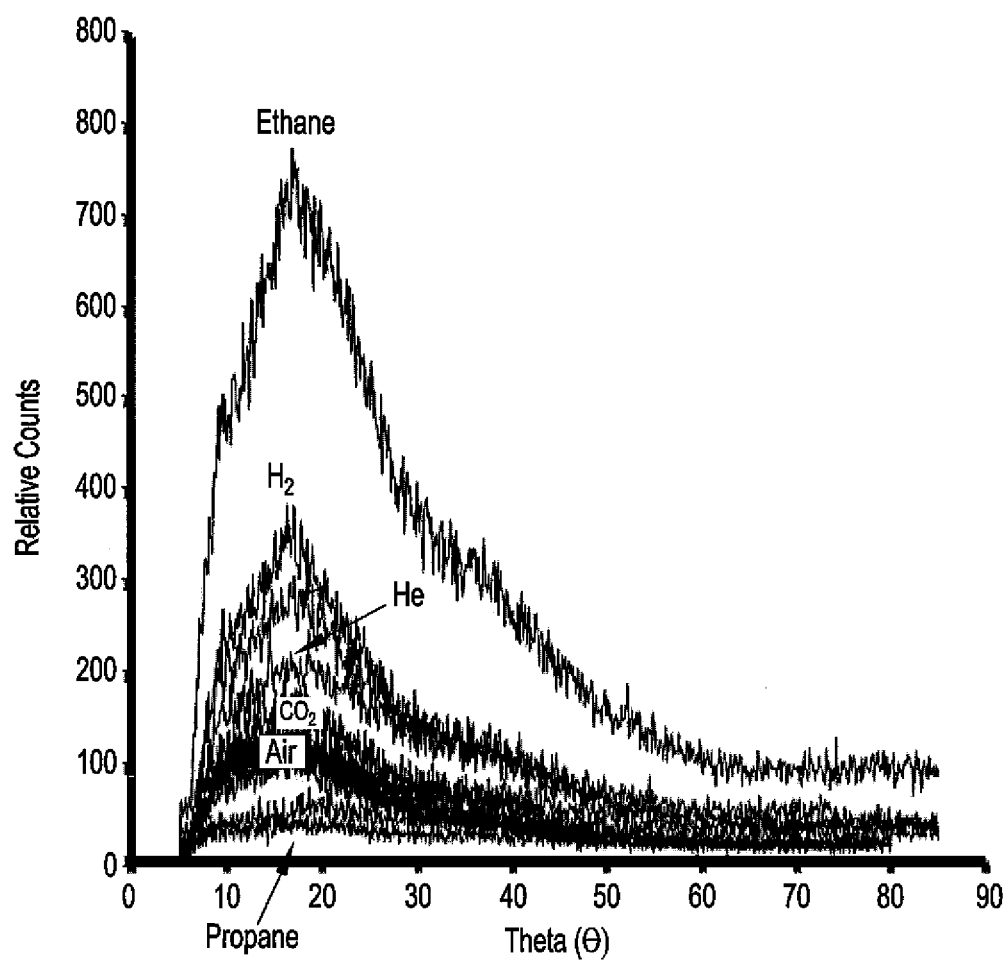
FIG. 19 is a chart showing a comparison on X-ray diffraction patterns of resorcinol-formaldehyde gels for different types of gases infused pending the gel formation.

FIG. 19 represents the relative crystallinity of RFG samples that were templated with different bubbling gases (i.e., propane, nitrogen, argon, carbon dioxide, air, methane, helium, oxygen, n-butane, propylene, hydrogen, ethylene and ethane) at 70° C. It was observed that the highest relative crystallinity was obtained when templating RFGs with ethane gas, whereas the lowest relative crystallinity corresponded to templating with propane gas.

Figure 20:
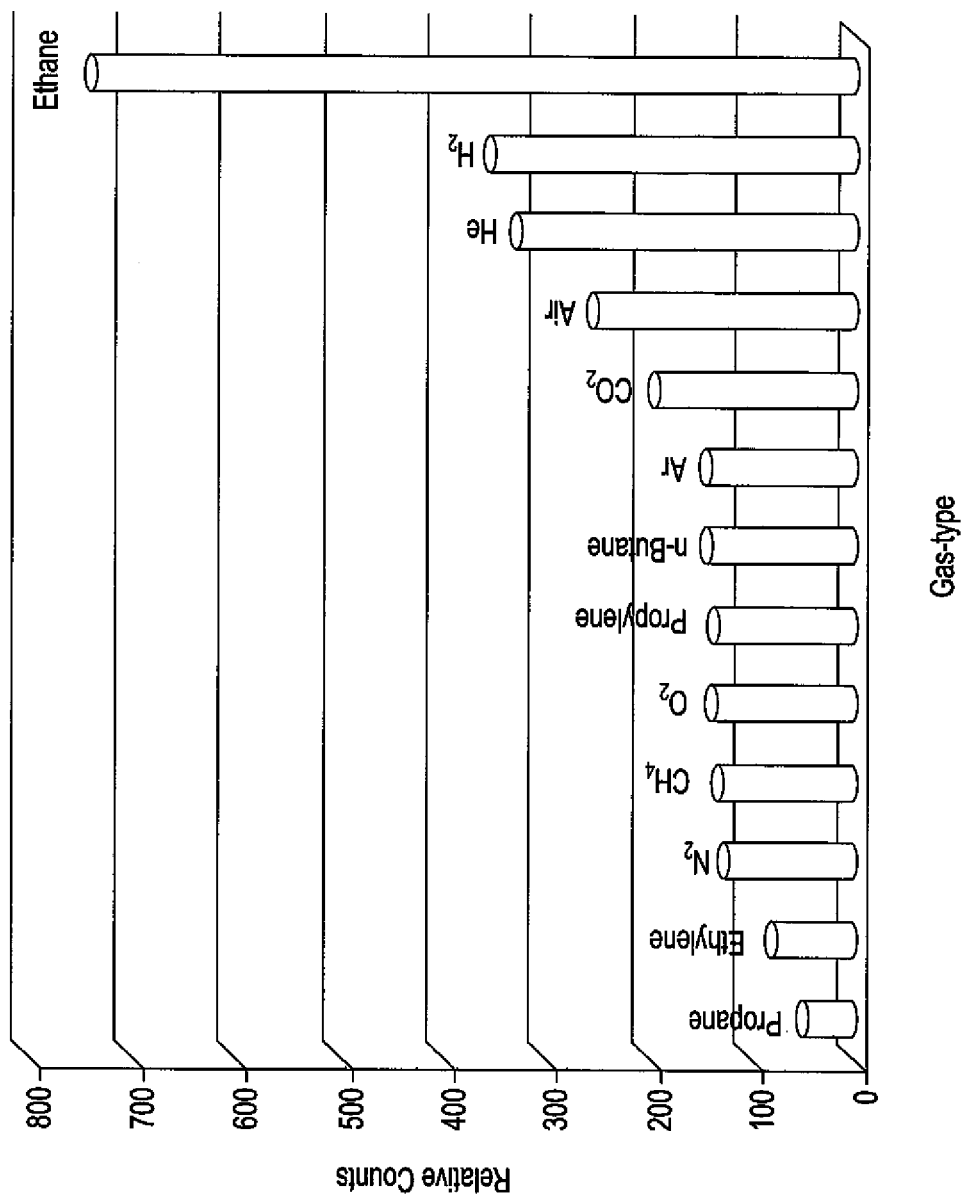
FIG. 20 is a chart comparing relative crystallinity of resorcinol-formaldehyde gels for different types of gases infused pending the gel formation.

FIG. 20 summarizes the sequence order of templating gas type effect on the relative crystallinity of gas-templated RFGs. This order can be summarized as ethane>hydrogen>helium>air>carbon dioxide>argon>n-butane>propylene>oxygen>methane>nitrogen>ethylene> propane. The variation of relative crystallinity ranged from 50 (for propane gas-templating) to 750 (for ethane gas-templating). The relative crystallinity value of the conventional method (with air gas) was ~220.

Therefore, bubbling of ethane gas into the reaction media makes the templated sample crystallinity about threefold in value more crystalline than the ones synthesized with the conventional method. On the other hand, bubbling of propane gas into the reaction media can make the crystallinity value about fourfold in value over the conventional method. Therefore, it could be deduced that templating with certain gases into the reaction media affects the gel structure significantly, either by enhancement to be more crystalline, or by diminishment to be more amorphous.

Example 9

Morphology of Resorcinol-Formaldehyde Gel Templates

SEM micrographs of the resorcinol-formaldehyde gel templates were taken with low and high magnifications for templates prepared by infusing the gel with gas bubbles of each of the gas types listed above. The micrographs show, respectively, the morphology changes in the gas-templated RFGs. It was observed that each gas has its special imprint in affecting the morphological shapes of templated RFGs. High magnification showed that some gases cause the formation of microspheres with sizes ranging from ~4 to ~7 μm within the templated resin, whereas others form smooth surfaces and sometimes lumpy mass (for example, $CO_2$ gas, $H_2$ gas, etc.) distributed on the surface, or look like stones distributed on the surface (for example, He gas), and some others form different shapes. Therefore, the type of gas used in the templating process imparts specific patterns on the morphologies of templated RFG products.

Example 10

Mass Loss of RFGs Upon Conversion to RF-ACGs

Figure 21:
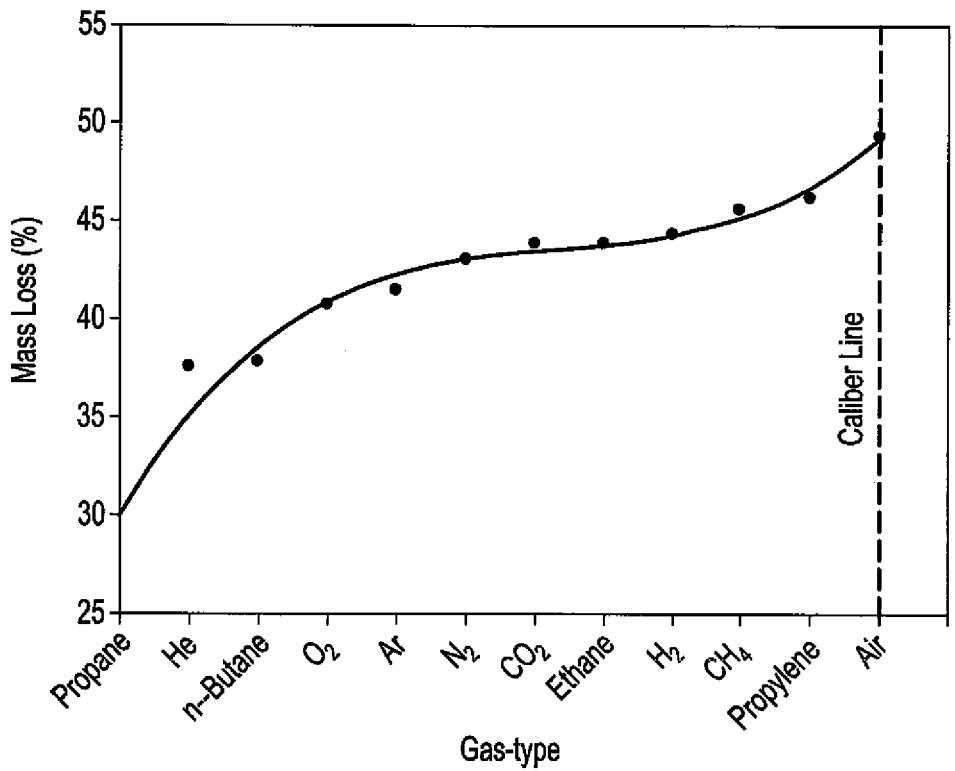
FIG. 21 is a graph showing thermogravimetric mass loss as a function of temperature for resorcinol-formaldehyde activated carbon gels for different types of gases infused pending the gel formation.

FIG. 21 shows the effect of type of gas infused into the sol-gel solution on the mass loss of templated RFGs after their carbonization and activation processes, respectively. It was observed that the lowest value of mass loss (~30%) was for the RFG templated with propane, whereas the highest value (~60%) was for the RFG templated with air. Consequently, the mass loss for the propane-templated RFG is almost half of that for the conventional sample (prepared with air). It could be concluded that gas templating of RFGs affects the extent of conversion upon preparing the activated carbons.

Example 10

Adsorption/Desorption Isotherms for Selected RF-ACGs

To further demonstrate the effect of gas-templating on the characteristics of the products resulting from gas-templated RFGs, activated carbons from selected RFGs that were templated with different gases were tested to assess their ability to adsorb/desorb several gas species. Only selected adsorption/desorption data are reported here for sake of brevity.

Figure 22:
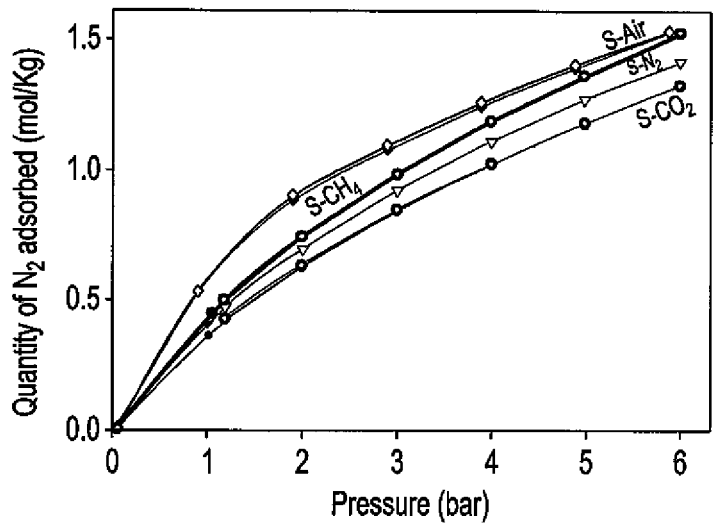
FIG. 22 is a chart comparing the adsorption/desorption isotherms of nitrogen gas ($N_2$) onto resorcinol-formaldehyde activated carbon gels for selected types of gases (nitrogen, methane, air, and carbon dioxide) infused pending the gel formation.
Figure 23:
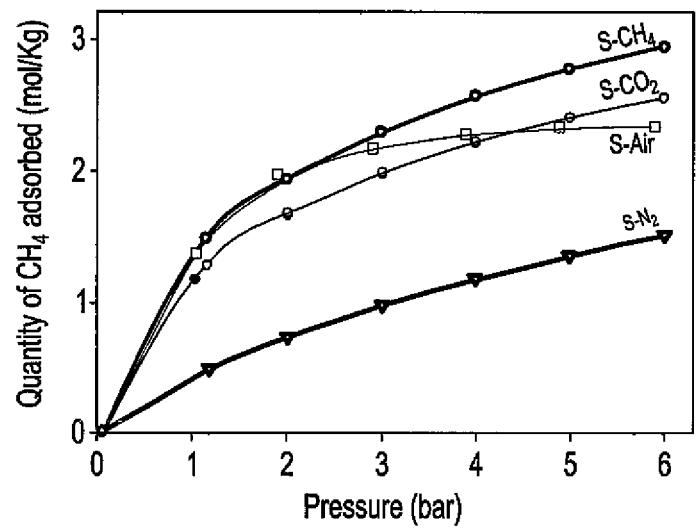
FIG. 23 is a chart comparing the adsorption/desorption isotherms of methane gas ($CH_4$) onto resorcinol-formaldehyde activated carbon gels for selected types of gases (nitrogen, methane, air, and carbon dioxide) infused pending the gel formation.
Figure 24:
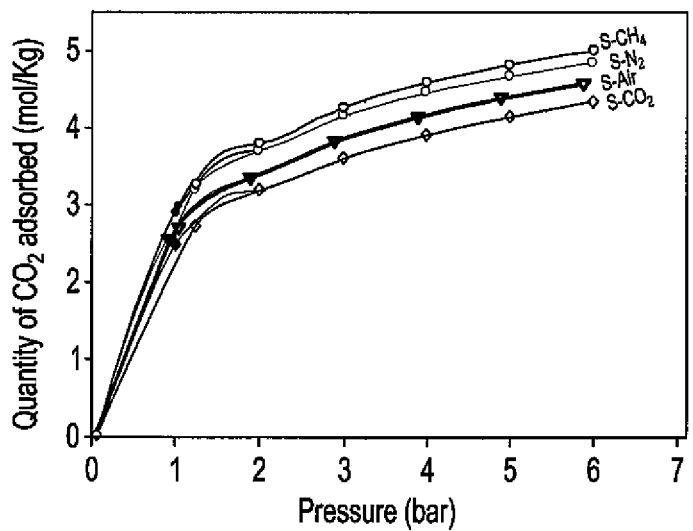
FIG. 24 is a chart comparing the adsorption/desorption isotherms of carbon dioxide gas ($CO_2$) onto resorcinol-formaldehyde activated carbon gels for selected types of gases (nitrogen, methane, air, and carbon dioxide) infused pending the gel formation.

FIGS. 22-24 show adsorption/desorption isotherms of different gases on templated RF-ACGs. It was observed from FIG. 22 that there is a difference in adsorption capacity in adsorption of $N_2$ for the samples templated with different gases (the gases infused into the gel templates during synthesis of the RF-ACG templates shown on the graph are prefixed by "S-"), even though these RF-ACG samples have a similar chemical character. The order of sequence for templating gases that have higher ability to adsorb $N_2$ is air>$CH_4$>N2>$CO_2$. FIG. 23 shows that the adsorption capacity of $CH_4$ (RF-ACG prepared from the $CH_4$-templated RFG) toward $CH_4$ gas is considerably higher than the others. The sequence order of adsorption/desorption isotherms of methane gas by the templates is $CH_4$>$CO_2$>air>$N_2$. FIG. 24 shows that there is a difference in adsorption capacities of templated RF-ACGs towards $CO_2$ gas. It was observed that adsorption capacity of the $CH_4$ template for $CO_2$ gas is the highest one, and the lowest one is the $CO_2$ template.

Therefore, it can be concluded that RFGs templated with different gases have unique adsorption/desorption characteristics from each other, even after being converted to activated carbons.

Example 11

Adsorption of Metal Ions by RF-ACG Xerogels

Figure 25:
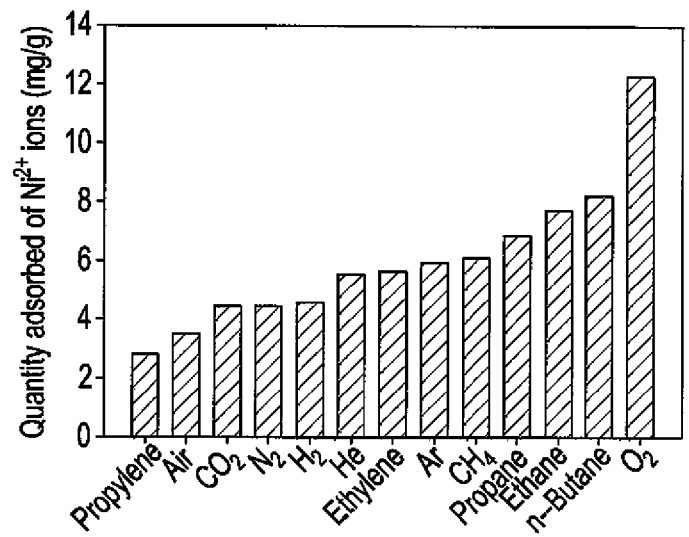
FIG. 25 is a chart comparing the adsorption isotherms of nickel ion ($Ni^{2+}$) onto resorcinol-formaldehyde activated carbon gels as a function of the type of gas infused pending the gel formation.
Figure 26:
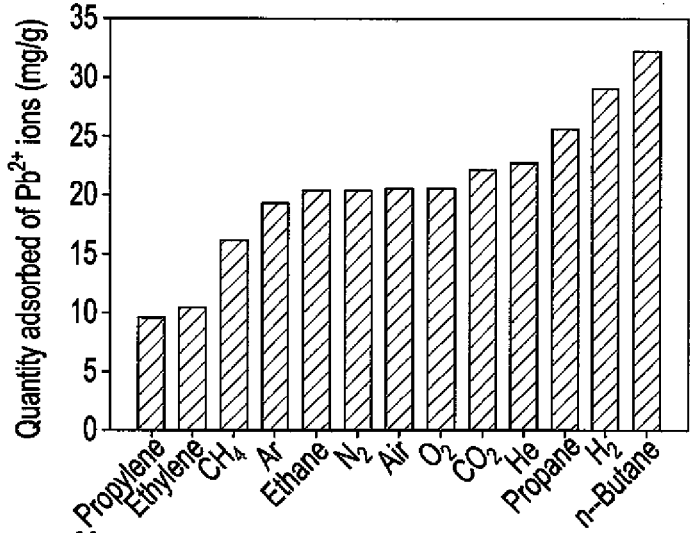
FIG. 26 is a chart comparing the adsorption isotherms of lead ion ($Pb^{2+}$) onto resorcinol-formaldehyde activated carbon gels as a function of the type of gas infused pending the gel formation.
Figure 27:
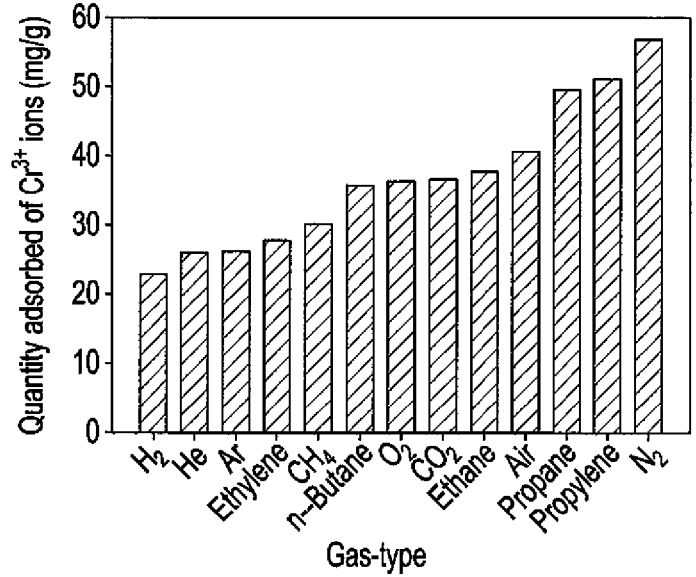
FIG. 27 is a chart comparing the adsorption isotherms of chromium ion ($Cr^{3+}$) onto resorcinol-formaldehyde activated carbon gels as a function of the type of gas infused pending the gel formation.

FIGS. 25-27 illustrate the adsorption of different metals ions ($Ni^{2+}$, $Pb^{2+}$ and $Cr^{3+}$) from their aqueous solution onto gas-templated RF-ACG samples. It was observed from FIG. 25 that the highest adsorption capacity of $Ni^{2+}$ ions adsorbed was obtained on oxygen RF-ACG templates, whereas the lowest adsorption capacity occurred for the sample prepared under bubbling of propylene gas. The improvement in adsorption capacity for the oxygen-templated sample is about fivefold of that corresponding to the gel templated with propylene gas. The adsorption capacity for $Ni^{2+}$ ions varies according to the gas used in the templating process during the synthesis of RF gels. The sequence order of $Ni^{2+}$ adsorption capacity corresponds to gel templates infused with different gases is oxygen>n-butane>ethane>propane>methane>argon>ethylene>helium>hydrogen>nitrogen>carbon dioxide>air>propylene. Similarly, FIG. 26 shows that templating gases used during the synthesis process of RF gels affects the adsorption capacity for $Pb^{2+}$ ions onto RF-ACG samples. The quantity of $Pb^{2+}$ ions adsorbed on the RF-ACG templated with n-butane gas is about 3.7 times greater than that of the gel template infused with propylene. The sequence order of templating gases for adsorption capacity for $Pb^{2+}$ ions is found as: n-butane>hydrogen>propane>helium>carbon dioxide>oxygen>air>nitrogen>ethane>argon>methane>ethylene>propylene. Furthermore, FIG. 27 shows that the highest adsorption capacity for $Cr^{3+}$ ions occurred on the RF-ACG templated with nitrogen gas, whereas the lowest value observed was for the gel templated with hydrogen gas. The sequence order of adsorption capacity for $Cr^{3+}$ ions on RF-ACGs templated with different gases is found as nitrogen>propylene>propane>air>ethane>carbon dioxide>oxygen>n-butane>methane>ethylene>argon>helium>hydrogen. The different affinity towards different ions is expected to be due to physical and chemical properties of ions and templated structures.

Overall, it could be concluded that the gas templating in reacting media (such as resorcinol and formaldehyde solution) affects the structure of the produced gel, gel derivatives, and accompanied applications. Further, the adsorption capacity for various ions could be enhanced significantly if using an adsorbent for which the precursor is templated with a certain gas. The optimum choice of templating gas, along with the corresponding templating conditions, can be determined upon investigations such as those described herein.

The color of gas-templated RFGs differed from one gel template to another according to the type of gas used in templating during the synthesis process, and was also affected by the accompanying parameters as aforementioned (e.g., gas parameters, temperature, etc.). As a result, it was observed that the color of the gas-templated RFGs ranged between pale-yellow to deep brown-yellow. As understood from the RF gel chemistries, the degree of the RFG color indicates the extent of its crosslinking. Therefore, it can be concluded that gas templating can affect the color of produced gel, which is related to the reaction extent during the polymerization process.

It is evident from the above that it is now possible to tailor and design the pore structure of gel-based materials through a gas-templating route that was not previously available. The resulting effects on the pore or physical properties of sol-gel templates formed with the infusion of gas bubbles or their corresponding activated carbon gels are the core idea of this subject. Resorcinol-formaldehyde gels were templated by bubbling different gases in their reaction media to prove the concept. The outcome results showed that gas templating of RF gels led to significant and clear changes in their porous and physical properties. These gases included propane, nitrogen, argon, carbon dioxide, air, methane, helium, oxygen, n-butane, propylene, hydrogen, ethylene and ethane. Furthermore, each of the aforementioned gases left unique characteristics in the pore structures and physical properties of the templated gels and products thereof. The pressure of the templating gas used in the gelation or polymerization reaction also affects the pore structure. In addition, gas templating of gel samples affects their thermal stability, morphology, crystallinity, and moisture content. Gas templating in polymerization or gelation reactions not only affects the polymerized or gelled products, but also affects the other products thereof, such as activated carbon gels made from templated polymers or gels. Such changes in the properties of templated gels or their derivative products may significantly affect their performance in various applications, such as adsorption, separation, or filtration processes. A demonstration was presented on the effects of gas templating of gels and their consequent activated carbons towards their adsorption capacities of species in both gaseous and aqueous states.

It is to be understood that the present invention is not limited to the embodiments described above, but encompasses any and all embodiments within the scope of the following claims.

We claim:

1. A method of forming sol-gel templates, comprising the steps of:
   (a) dissolving gel precursors and a catalyst in a solvent to form a sol-gel matrix;
   (b) allowing gelation to continue until a colloidal solution of the gel is obtained;
   (c) curing the colloidal solution to obtain a gel; and
   (d) infusing gas bubbles into the sol-gel matrix through at least one gas delivery tube having an outlet immersed in the sol-gel matrix during steps (a) and (b).

2. The method of forming sol-gel templates according to claim 1, further comprising the step of drying the gel.

3. The method of forming sol-gel templates according to claim 2, wherein the drying step is performed at ambient pressure, whereby a xerogel is formed.

4. The method of forming sol-gel templates according to claim 3, further comprising the step of heating the xerogel at about 700° C. in a flow of carbon dioxide to form an activated carbon sol-gel template.

5. The method of forming sol-gel templates according to claim 2, wherein the drying step is performed at supercritical temperature, whereby an aerogel is formed.

6. The method of forming sol-gel templates according to claim 2, wherein the catalyst comprises a base.

7. The method of forming sol-gel templates according to claim 6, further comprising the step of adjusting pH of the sol-gel matrix to about pH 7.

8. The method of forming sot-gel templates according to claim 2, wherein the gas bubbles are bubbles of a gas selected from the group consisting of carbon dioxide, methane, nitrogen, helium, argon, oxygen, hydrogen, propane, ethane, propylene, ethylene, air, and n-butane.

9. The method of forming sol-gel templates according to claim 8, wherein the gas is delivered at a pressure between 1 bar and 7 bars.

10. The method of forming sol-gel templates according to claim 2, wherein the gel precursors comprise resorcinol and formaldehyde.

11. The method of forming sol-gel templates according to claim 10, wherein the catalyst comprises sodium carbonate.

12. The method of forming sol-gel templates according to claim 10, wherein the solvent comprises water.

13. The method of forming sol-gel templates according to claim 11, further comprising the step of adjusting pH of the sol-gel matrix to about pH 7.

14. The method of forming sol-gel templates according to claim 10, wherein the gas bubbles are bubbles of a gas selected from the group consisting of carbon dioxide, methane, nitrogen, helium, argon, oxygen, hydrogen, propane, ethane, propylene, ethylene, air, and n-butane.

15. The method of forming sol-gel templates according to claim 10, wherein the drying step is performed at ambient pressure, whereby a xerogel is formed, the method further comprising the step of heating the xerogel at about 700° C. in a flow of carbon dioxide to form an activated carbon sol-gel template.

16. The method of forming sol-gel templates according to claim 10, wherein said curing step comprises heating the colloidal solution at a temperature of about 70° C. in a sealed container.

* * * * *